No. 795,287. PATENTED JULY 25, 1905.
O. M. KNOX.
CULINARY VESSEL.
APPLICATION FILED MAY 11, 1905.
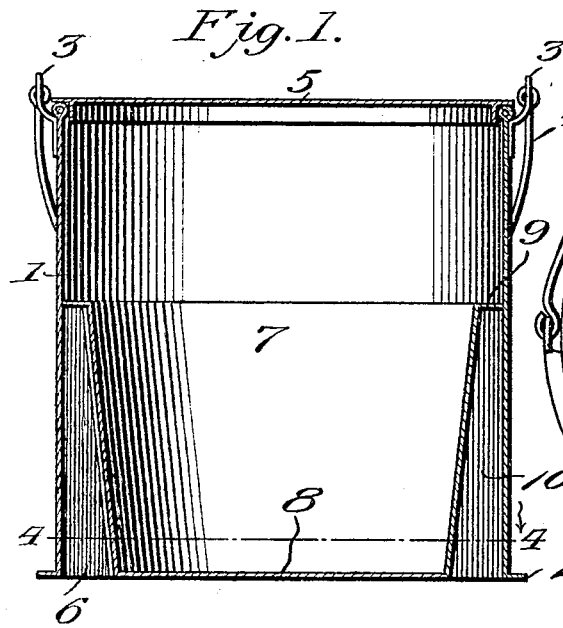
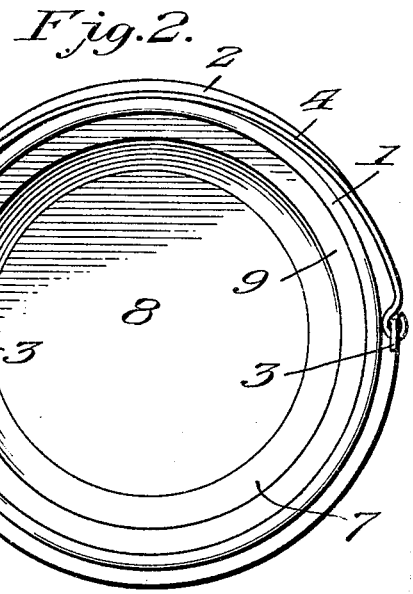
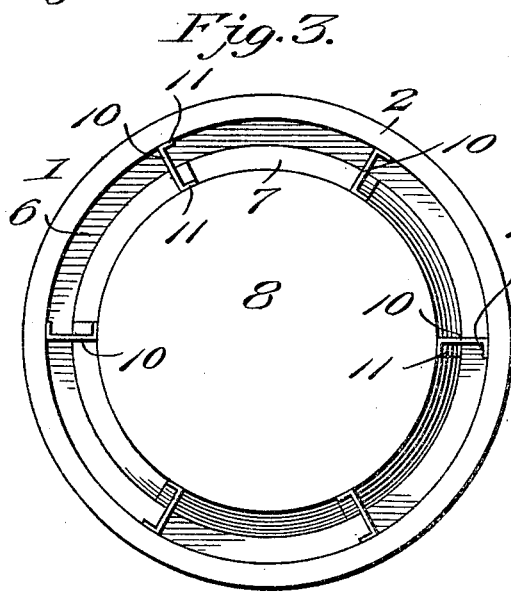
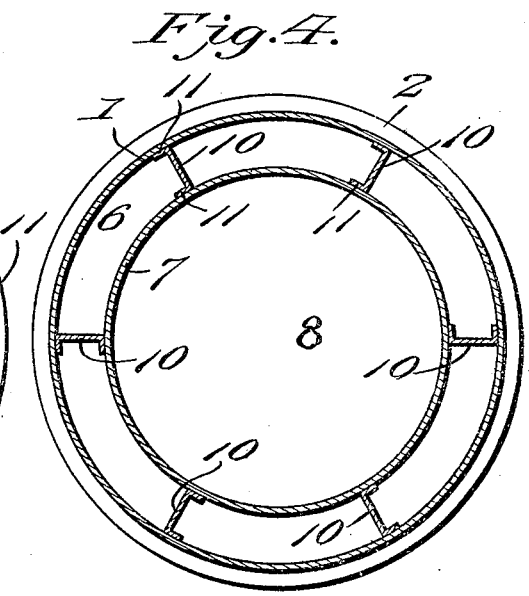
Witnesses
Edwin G. McKee
Frank B. Hoffman
Inventor
Orville M. Knox,
By C. C. Hines,
Attorney

UNITED STATES PATENT OFFICE.

ORVILLE M. KNOX, OF ONEIDA, NEW YORK.

CULINARY VESSEL.

No. 795,287. Specification of Letters Patent. Patented July 25, 1905.

Application filed May 11, 1905. Serial No. 259,988.

*To all whom it may concern:*

Be it known that I, ORVILLE M. KNOX, a citizen of the United States, residing at Oneida, in the county of Madison and State of New York, have invented certain new and useful Improvements in Culinary Vessels, of which the following is a specification.

This invention relates to culinary vessels, and especially to those of the type known as "boilers," and has for its objects to produce a comparatively simple inexpensive device of this character in which an extended surface is presented to the action of the flame or other heating medium, thus insuring a rapid heating of the vessel and a consequent economizing of fuel and one wherein the surface of the vessel subjected to the action of heat is inclosed, thus to confine the heat to and obviate its rapid radiation from said surface.

A further object of the invention is to provide a device of this class comprising an outer jacket and an inner vessel-section in which the latter is wholly surrounded by an inclosed heating-chamber, thereby subjecting its entire surface to the action of heat, and one wherein the vessel-section is firmly supported and braced within the jacket, thus insuring strength and durability of the vessel as a whole.

With these and other objects in view the invention comprises the novel features of construction and combination of parts more fully hereinafter described.

In the accompanying drawings, Figure 1 is a vertical longitudinal section taken centrally through a vessel embodying the invention. Fig. 2 is a top plan view of the same with the cover removed. Fig. 3 is a bottom plan view of the vessel. Fig. 4 is a cross-section taken on the line 4 4 of Fig. 1.

Referring to the drawings, 1 designates an outer open-ended jacket or casing of tubular form composed of sheet metal or other appropriate material and having at its lower end an outturned base-flange 2 and at its upper end ears 3 for the attachment of a pivoted bail or handle 4, there being applied to the upper end of the jacket a removable cover 5. Disposed within the lower part of the jacket 1 and spaced therefrom to form a heating-chamber 6 is an inner vessel member or section 7, constituting the lower portion of the vessel or utensil, the upper portion of which is formed by the upper part of the jacket, said section 7, which preferably has downwardly-tapered side walls, having its bottom 8 arranged in a plane common with that of the lower end of the jacket and being provided at its upper open end with an outturned flange 9, formed to fit within the jacket, to which it is united in any appropriate manner, and constituting a closure for the normally open end of the chamber 6.

The vessel 7 is supported and braced within the jacket 1 by a plurality of bracing members or webs 10, situated in the chamber 6 at appropriately-spaced intervals around the vessel 7 and radially between the latter and jacket, said braces, which are extended wholly through the chamber longitudinally from the flange 9 to the bottom 8 of the vessel, being provided with longitudinal edge flanges 11, attached by soldering or in other suitable manner to the vessel and jacket.

In practice when the utensil is seated upon a stove the flame or other heating medium will pass into the inclosed chamber around the vessel-section 7 for action upon the bottom and sides of the latter, which thus presents an extended surface to the action of the heat and insures rapid heating of the contents of the vessel and an economizing of fuel, it being observed that, owing to the vessel 7 being inclosed by and spaced from the jacket, radiation of the heat from the vessel 7 is measurably retarded, thus preventing waste of heat. Further, it is apparent that under the foregoing construction a heating-chamber of ample dimensions is provided around the inner vessel and that the latter is firmly connected and braced within the jacket, while the flange 9 subserves the twofold function of a horizontal brace between the jacket and upper end of the vessel, said brace being continuous around the latter and a closure for the upper end of the heating-chamber.

Having thus described the invention, what is claimed as new is—

1. A cooking utensil comprising an outer jacket and an inner vessel spaced to produce a chamber surrounding the latter, said chamber being open at its lower end and closed at its top, and braces in the chamber extending between and attached to the vessel and jacket.

2. A cooking utensil comprising an outer jacket and an inner vessel surrounded by and spaced from the jacket to produce a chamber, a flange on the vessel constituting a closure for the upper end of the chamber, and braces in the chamber extending radially between and attached to the vessel and jacket.

In testimony whereof I affix my signature in presence of two witnesses.

ORVILLE M. KNOX.

Witnesses:
   CHARLES H. MYERS,
   EUGENE S. MACKIN.